Patented Apr. 27, 1937

2,078,389

UNITED STATES PATENT OFFICE 2,078,389

FLAT VARNISH

Orville L. Kinder, Indianapolis, Ind., assignor to Advance Paint Company, Indianapolis, Ind.

No Drawing. Application February 15, 1935, Serial No. 6,714

5 Claims. (Cl. 134—26)

This invention relates to an improvement in the production of flat varnishes having superior qualities to the customary flat varnishes now available in commerce.

One particular method of preparing my varnish is accomplished in the following manner. In giving the relative proportions of the various ingredients, it is to be understood that unless otherwise specified, the stated proportions are only approximate and may be deviated from one way or the other to a considerable extent without materially affecting the result.

I initially prepare a solution of calcium chloride in water. The calcium chloride is added to bring the solution up to a specific gravity of 1.0316 at 20° C. or to give substantially a 4% solution. I also prepare a second solution of aluminum chloride in water, using a sufficient amount of the aluminum chloride ($Al_2Cl_6$) to give the solution a specific gravity of 1.1207 at 20° C., or substantially a 16% solution. In reference to the calcium chloride, any soluble calcium, zinc or magnesium salt may be substituted therefor and in regard to the aluminum chloride, any soluble aluminum salt may be substituted therefor, providing that salt is not aluminum sulphate when used with a calcium salt or is not such a salt as will effect a precipitate.

In order to merely express one workable set of proportions, I select the units to be grams and cubic centimeters, although in a commercial scale the units would probably be based on pounds and gallons. I dissolve approximately 187 grams of flake caustic soda in 6,000 c. c. of water; then to this solution I add approximately 400 grams of Japan wax and bring the mixture to a boil. When saponification has been completed, I mix together 1,765 c. c. of the aluminum chloride solution and 1,440 c. c. of the calcium chloride solution. This resultant mixture of the two salt solutions is then allowed to run into the hot soap solution produced by the saponification of the Japan wax. Of course, this procedure may be reversed to flow the soap into the salt solution. The stated mixtures are flowed one into the other as the case may be by a small stream and agitated and heated until a precipitate is formed and the precipitation is completed. The flowing of the salt solutions into the soap solution by a small stream is advised in order to avoid the otherwise forming of large clots.

While Japan wax is preferable, any fatty acid may be substituted for part thereof up to 25 per cent.

The resultant precipitate is then filtered off and washed several times by water. The washed precipitate is then dried at atmospheric pressure to bring the moisture content down to around the neighborhood of from 2 to 5%, or at least dry enough to permit ready grinding. After thus being dried, the precipitate is mechanically ground to a powder. This powdered form of the precipitate is then incorporated in a selected varnish of an oleo-resinous type. The powdered precipitate is incorporated in the varnish by grinding, such as by a stone or pebble mill and is employed in the proportion of about one-half pound of the powder to a gallon of varnish, depending entirely upon the sheen or gloss desired, less powder giving a higher gloss. After thus being incorporated in the varnish, the varnish is allowed to stand without further attention until practically a maximum viscosity is reached. This period of rest seems to be essential in producing a varnish of the desired properties. A characteristic of the resultant product is that there is no settling out of the ingredients.

In reference again to the saponifying of the Japan wax, I desire to have an excess of the alkali present since I do not want a neutral soap. This excess seems to be quite important in producing the end result. However, if the excess greatly exceeds that which will be produced by the proportion above indicated, the excess alkali will produce an opaque film after the varnish is applied to a surface. If the excess alkali is controlled to be somewhere around the proportion above indicated, then the film is perfectly transparent. If there is not sufficient alkali, then difficulty may be experienced in that a slow or non-drying varnish is produced. The flat varnish produced by the above process and ingredients proportioned as indicated gives a varnish with a good viscosity, drying to have a very tough film. The film so produced is free from sags and runs. It has great adhesion to a surface, but is of a non-penetrating character. The film toughness does not deteriorate with age. In fact the film is so good that in many cases one coat of the varnish is entirely sufficient where with other varnishes heretofore produced, two coats would be absolutely essential. A further advantage of my improved varnish is that a flat film is produced without sacrificing the toughness and other desirable characteristics of the film.

I claim:

1. A flat varnish composed of an oleo-resinous varnish and a dried precipitate secured from mixing a water solution of a water soluble salt of the metals of the group calcium, zinc and magnesium with a non-precipitating water soluble salt of aluminum, with an alkaline Japan wax soap.

2. A composition of matter that will form a glazed surface comprising approximately one half pound of a dried precipitate obtained from mixing approximately equal volumes of a 1.0316 (20° C.) sp. gr. water solution of a chloride of one of the metals in the group calcium, zinc, and magnesium, and a 1.1207 sp. gr. (20° C.) water solution of a non-precipitating aluminum salt, with Japan wax soap produced by about 187 gm. sodium hydroxide in about 6000 c. c. water added to about 400 gm. of the wax, the said dried precipitate being added to about a gallon of an oleo-resinous varnish.

3. An oleo-resinous flat varnish containing an insoluble metallic soap of fatty acids of Japan wax, the metallic radical being one of the metals in the group of calcium, aluminum, magnesium and zinc.

4. An oleo-resinous flat varnish including the precipitate from water soluble saponified fatty acids of Japan wax mixed with a water solution of a salt of a metal in the group of calcium, magnesium and zinc, and a water solution of an aluminum salt.

5. A composition of matter that will form a glazed surface comprising a precipitate obtained from a combined mixture of solutions in approximate equal volume of approximately 4 per cent of a salt of a metal in the group of calcium, magnesium and zinc, and of approximately 16 per cent of an aluminum salt, mixed with saponified fatty acids of Japan wax having an excess of alkali, mixed with an oleo-resinous varnish.

ORVILLE L. KINDER.